Sept. 15, 1964 M. J. CELOVSKY 3,149,218
METHOD AND APPARATUS FOR MAKING DIES AND ROLLS
Filed April 30, 1962 6 Sheets-Sheet 1
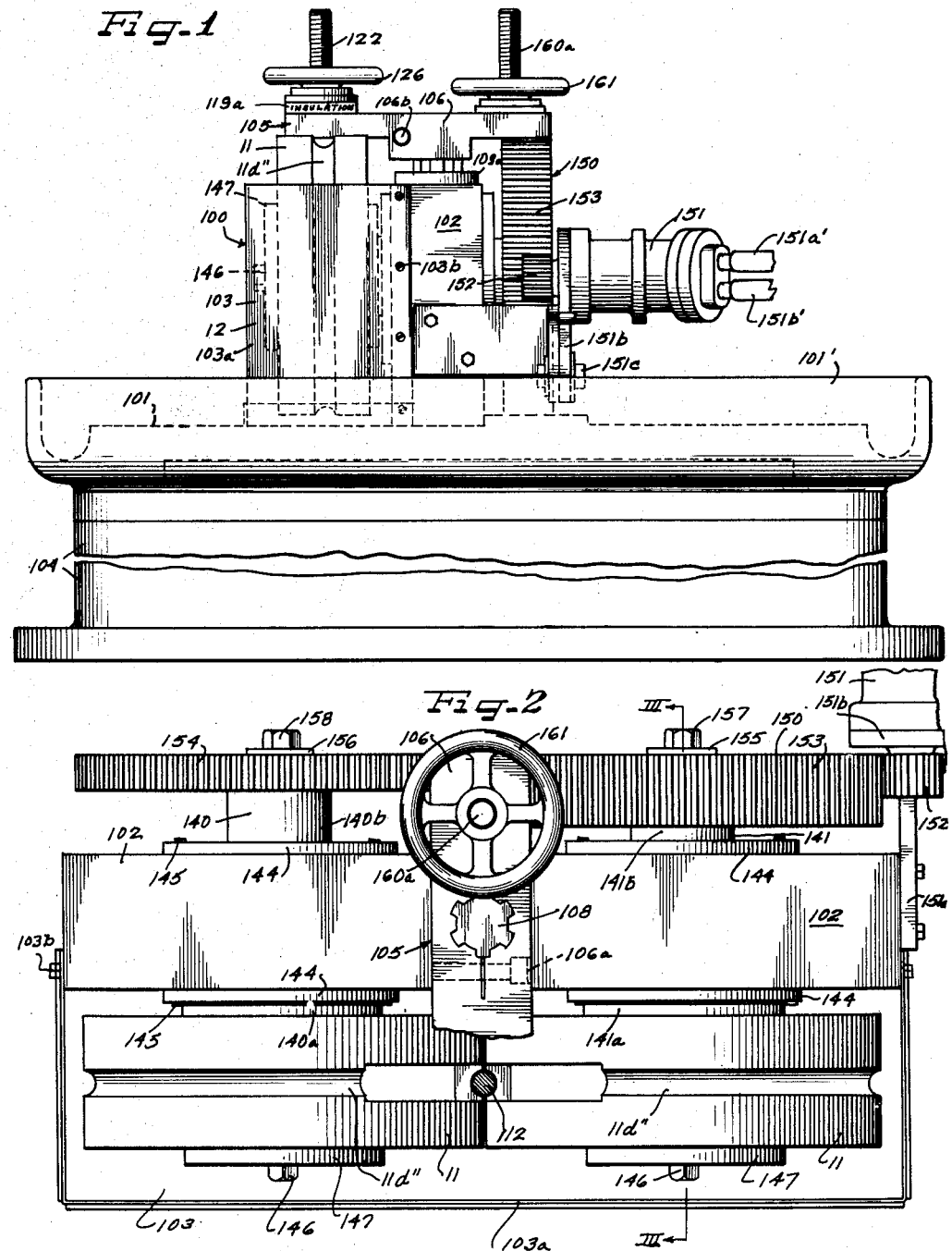
INVENTOR.
Michael J. Celovsky
BY
ATTORNEYS Sept. 15, 1964  M. J. CELOVSKY  3,149,218
METHOD AND APPARATUS FOR MAKING DIES AND ROLLS
Filed April 30, 1962  6 Sheets-Sheet 2
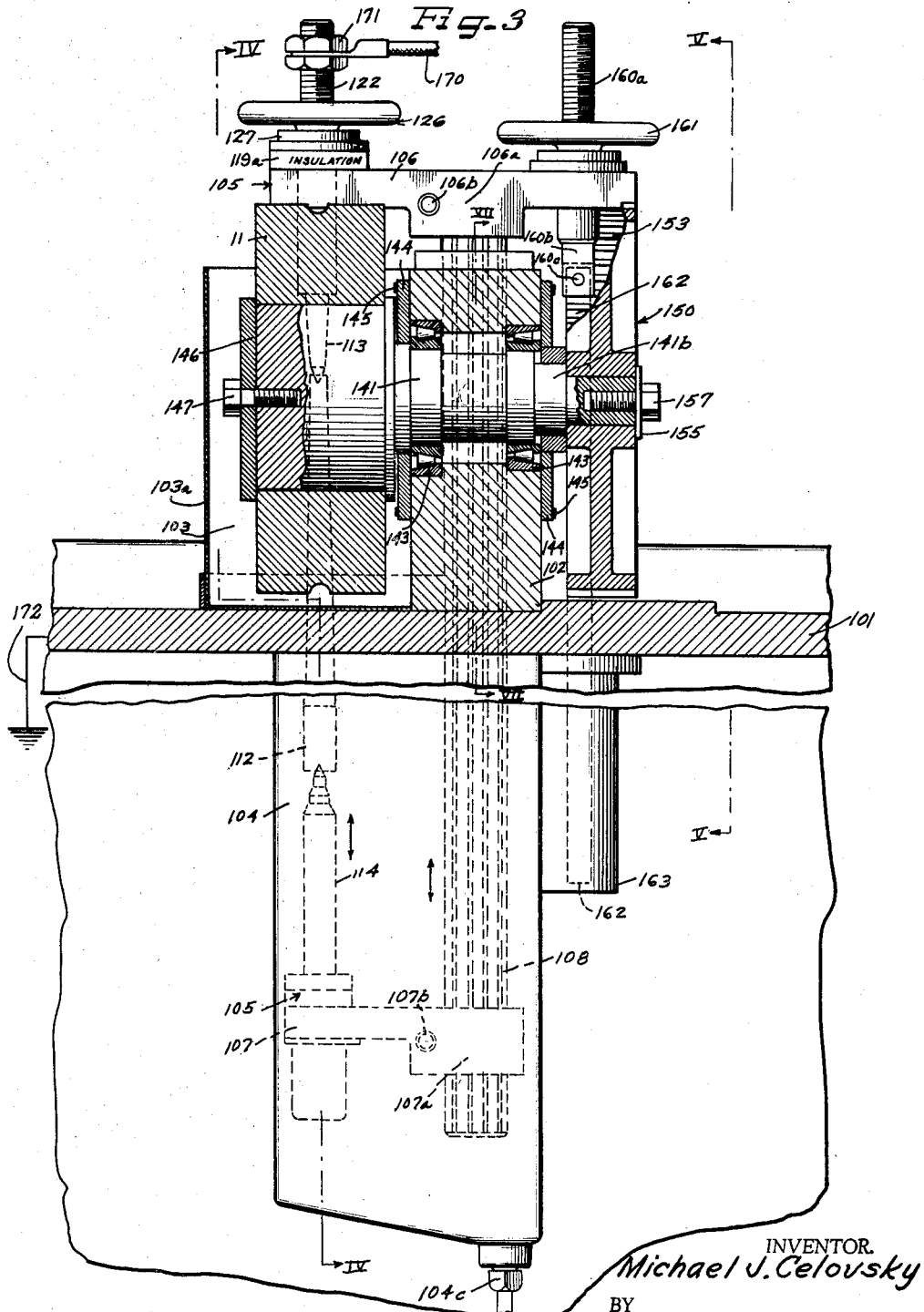
INVENTOR.
Michael J. Celovsky
BY
ATTORNEYS

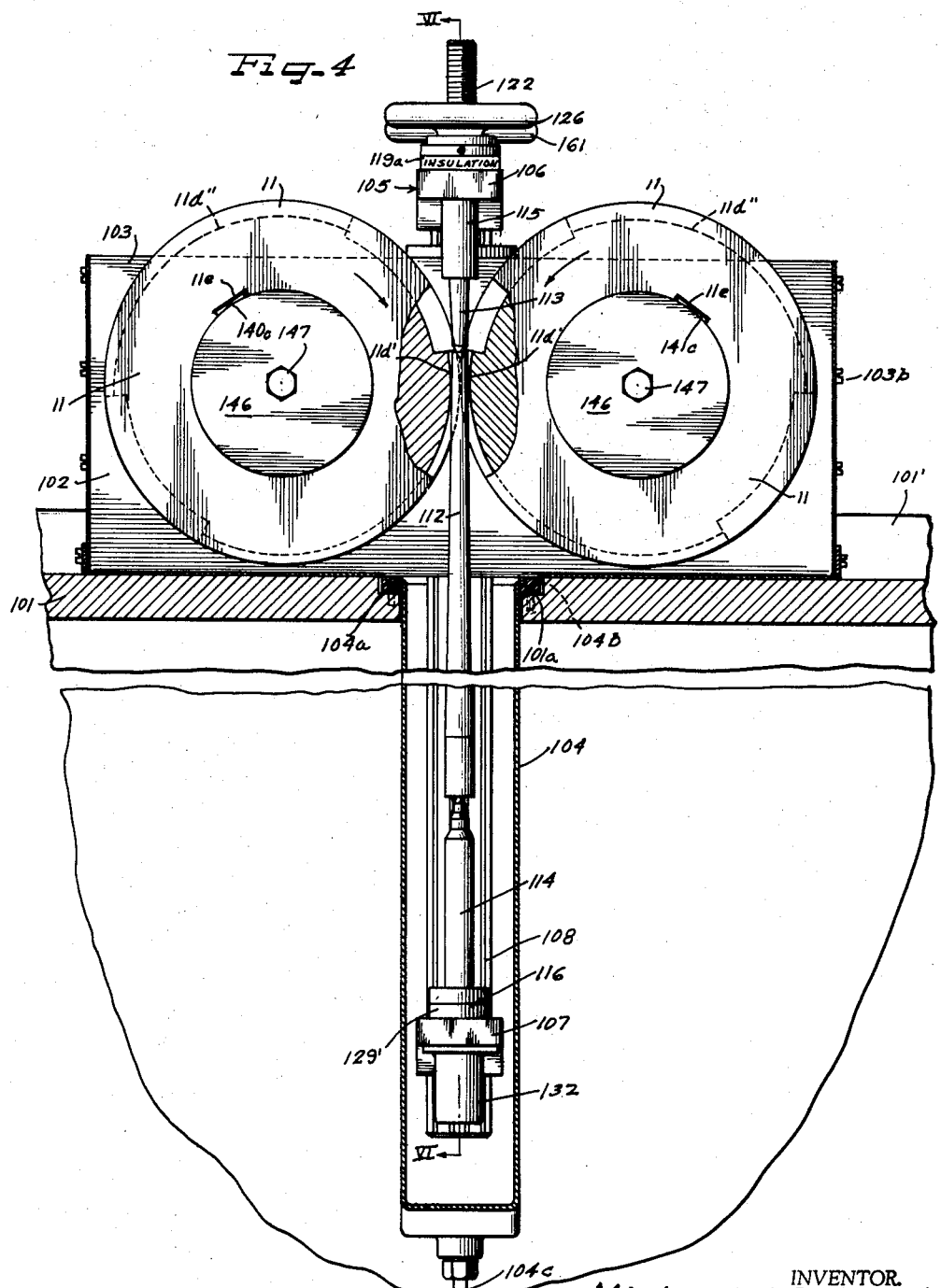

Sept. 15, 1964　　　M. J. CELOVSKY　　　3,149,218
METHOD AND APPARATUS FOR MAKING DIES AND ROLLS
Filed April 30, 1962　　　　　　　　　　6 Sheets-Sheet 4
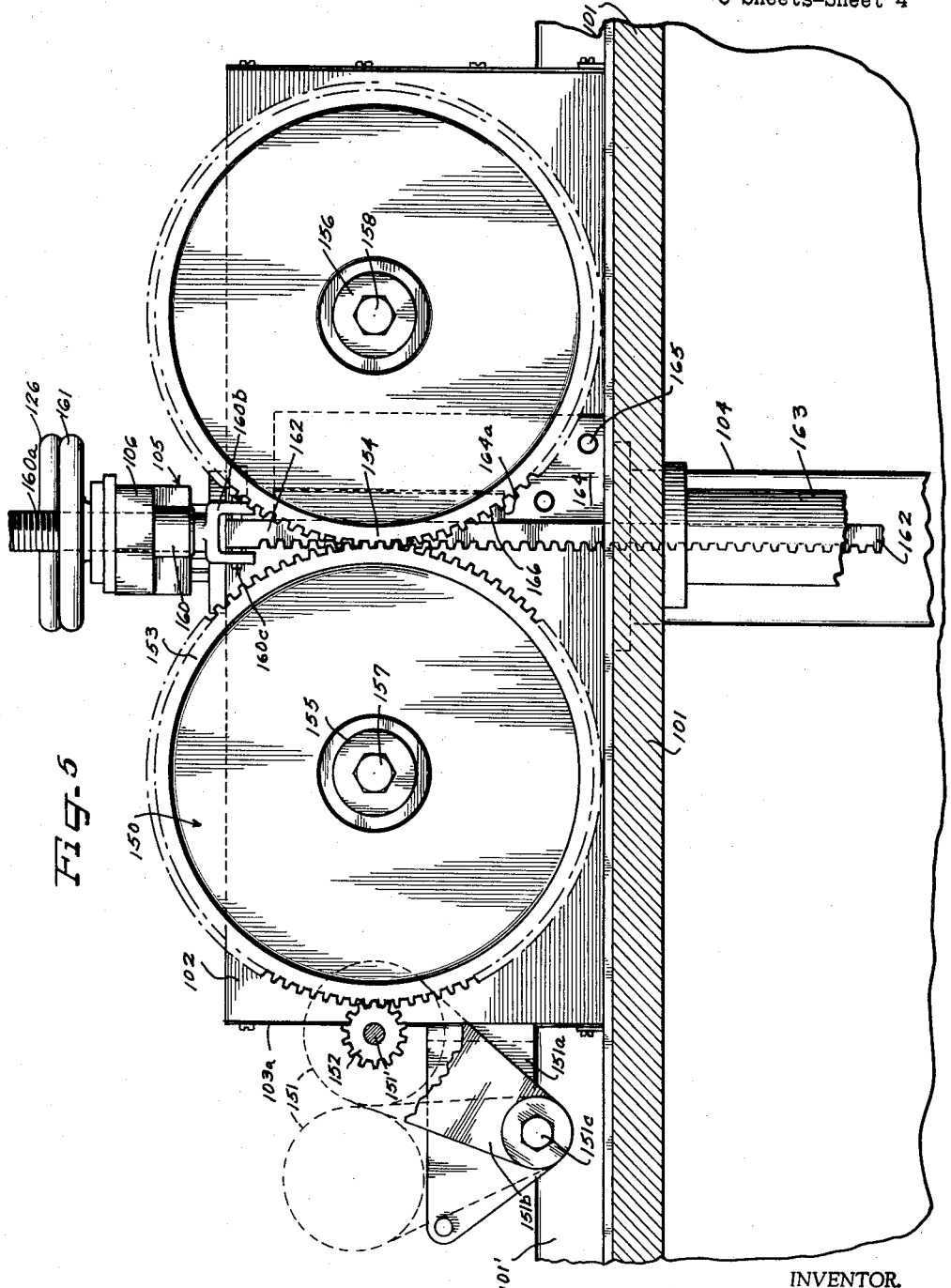
INVENTOR.
Michael J. Celovsky
BY
ATTORNEYS Sept. 15, 1964  M. J. CELOVSKY  3,149,218
METHOD AND APPARATUS FOR MAKING DIES AND ROLLS
Filed April 30, 1962  6 Sheets-Sheet 5
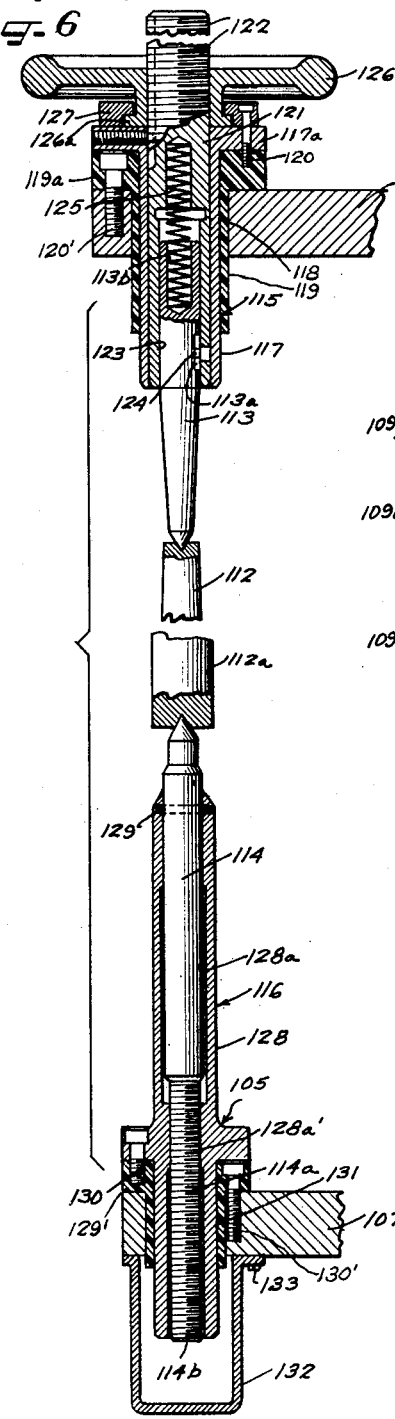
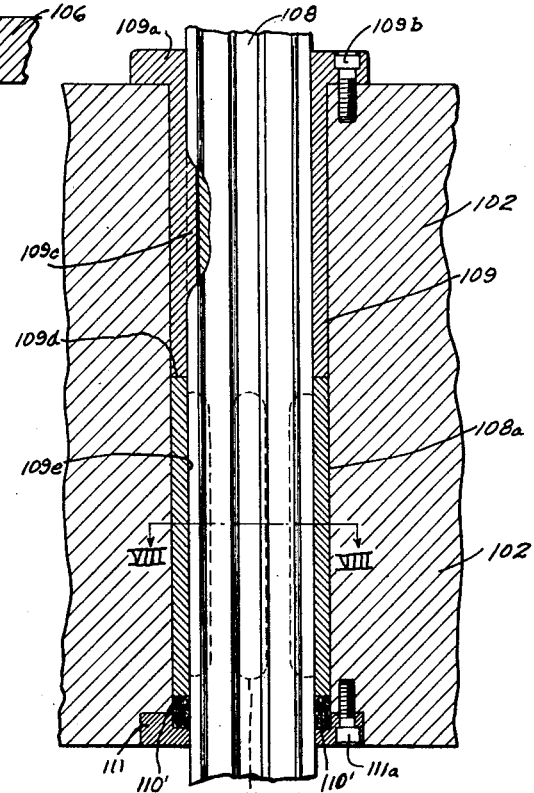
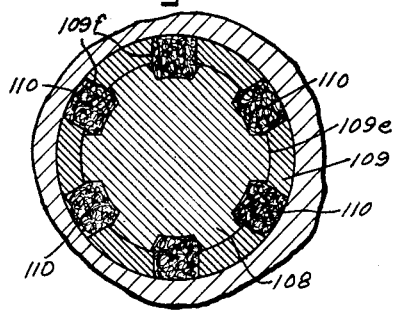
INVENTOR.
Michael J. Celovsky
BY
ATTORNEYS

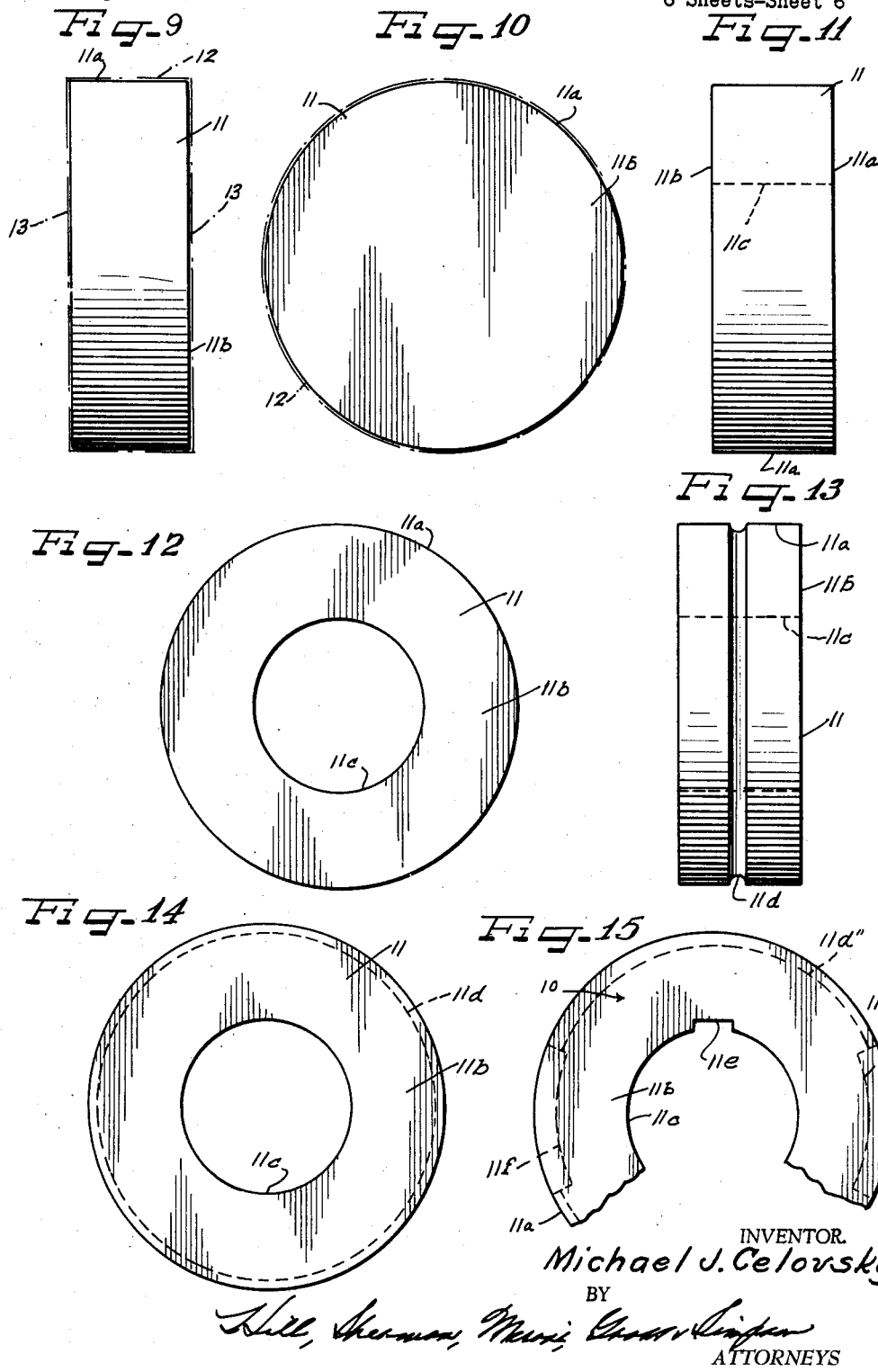

united States Patent Office 3,149,218
Patented Sept. 15, 1964

3,149,218
METHOD AND APPARATUS FOR MAKING
DIES AND ROLLS
Michael J. Celovsky, 14501 Abington Road,
Detroit 27, Mich.
Filed Apr. 30, 1962, Ser. No. 191,136
24 Claims. (Cl. 219—69)

This invention relates to apparatus and method for cutting electrically conductive materials, more especially hard metals such as carbides, tool steels, and stainless steels, by the erosive effect of electric sparks.

The present application is related to my copending earlier filed U.S. application for patent entitled "Method and Apparatus for Manufacturing Dies and Rolls," Serial No. 111,541, filed on May 22, 1961.

More particularly, the present invention relates to an apparatus and method for tapering grooves in articles such as rod or tube reducing metal rolls, ring dies, roll dies, half dies, and the like.

In the past, considerable difficulty has been experienced in the manufacture of tube reducing rolls for it has been necessary to rough machine tapered grooves in the circumference of the rolls in such a way so as to leave enough material so the tapered grooves may be finished after heat treatment by manual methods. The reason for this is that it is virtually impossible to accurately control and maintain any precise dimension in a metallic roll having surfaces machined therein prior to heat treatment. Once the tool steel has been heat treated the tool steel is too hard to machine and the tapered grooves in the rolls are commonly formed to final shape by hand methods.

In accordance with the present invention, it is now possible to rough and finish machine the circumferential tapered roll grooves as well as relief angles tangential to the radius of the groove in rolls made from hard materials such as tool steel after the rolls have been heat treated so that the time consuming expensive hand methods previously employed are no longer necessary. It has been found that where the electrode is disposed below the rolls and moved vertically upwardly toward the rolls as the rolls are contemporaneously rotated toward the electrode in arcuate paths, that the material cut from the rolls may fall freely away from the rolls and away from the electrode thus enabling a smoother operation whereby the rolls may be machined to shape in a reduced amount of time. Previously, the electrode was disposed above the rolls and the rolls were rotated toward the electrode as the electrode was moved downwardly between the rolls and the metal particles removed from the rolls tended to accumulate about the electrode in the area of the machined surfaces of the roll. As a consequence, it was necessary that the machine be shut down periodically in order to remove the accumulated metal at the juncture of the electrode with the rolls. Also, there was a greater tendency for electrical shorts to occur where the metal particle mass was disposed in large concentration at the cutting zone between the electrode and the rolls.

An important object of this invention is to provide a new and improved metal article cutting apparatus which may be operated for prolonged periods without interruption.

An important feature of this invention is to provide a new and improved method and apparatus for machining grooves in rolls in such a way that cut particles of metal are allowed to fall freely away from the cutting zone without interfering with the cutting operation.

A further important object of the present invention is to provide a new and improved apparatus and method of manufacturing tube reducing metal rolls so the circumferential tapered grooves may be formed in heat treated material without using the former expensive time consuming practices used to form the tapered grooves to final shape.

Another important object of the present invention is to provide a new and improved apparatus and method of utilizing the erosive effect of electric sparks for tapering the grooves on tube reducing metal rolls while the rolls are in a heat treated hardened state.

Still another important object is to provide an improved apparatus and method for forming tube reducing rolls at a substantially reduced cost Yet another object of this invention is to provide a new and improved tube reducing metal roll.

According to the general features of the present invention, there is provided an apparatus for machining a groove in a metal article while in a heat treated hardened state which includes a fluid bath, means for supporting the article in said bath, a tapered electrical discharge electrode having a configuration corresponding to the groove shape to be machined in the metal article being mounted adjacent the article, means for energizing the electrode and for causing the tapered electrode to emit an electrical spark discharge for effecting cutting of the grooves in a surface of the article, and means for moving the energized electrode vertcally upwardly in the bath and tangentially of the article while contemporaneously moving the article in an arcuate path of rotation on a side of the electrode to establish a cutting zone along the article surface opposite the electrode.

In accordance with still other features of this invention an apparatus is provided for electro-machining one or more metal rolls while in a heat treated hardened state.

According to still another feature of the present invention, the electrode may be moved vertically upwardly or downwardly or horizontally of the rolls to effect cutting of the grooves.

Other objects, features and advantages of the present invention will more readily become apparent from the following detailed description of a preferred embodiment, taken in conjunction with the accompanying sheets of drawings, in which:

FIGURE 1 is a partially fragmentary front view of an apparatus for machining tapered grooves in a pair of rolls;

FIGURE 2 is a top plan view of the apparatus shown in FIGURE 1;

FIGURE 3 is an enlarged vertical section taken substantially on the line III—III looking in the direction indicated by the arrows, as shown in FIGURE 2;

FIGURE 4 is a vertical section taken substantially on the line IV—IV looking in the direction indicated by the arrows, as shown on FIGURE 3;

FIGURE 5 is a vertical section taken substantially on the line V—V looking in the direction indicated by the arrows, as shown on FIGURE 3;

FIGURE 6 is a fragmentary vertical section taken substantially on the line VI—VI looking in the direction indicated by the arrows, as shown in FIGURE 4;

FIGURE 7 is a vertical section of the spline mounting taken substantially on the line VII—VII looking in the direction indicated by the arrows as shown on FIGURE 3;

FIGURE 8 is an enlarged fragmentary cross-sectional view taken substantially on the line VIII—VIII looking in the direction indicated by the arrows, as shown on FIGURE 7;

FIGURE 9 is an edge elevation of a roll blank;

FIGURE 10 is a front side elevation of the roll blank shown on FIGURE 9;

FIGURE 11 is an edge elevation of the blank shown in FIGURE 10 only with the blank having a machined bore;

FIGURE 12 is a side elevation of the blank shown in FIGURE 11;

FIGURE 13 is an edge elevation similar to FIGURE 11 only with a circumferential groove machined therein;

FIGURE 14 is a side elevation of a blank as shown in FIGURE 13; and

FIGURE 15 is a side elevation of a finished tube reducing metal roll, as produced by the instant apparatus and method.

The reference numeral 10 in FIGURE 9 indicates a tube reducing metal roll and the present invention concerns a new method and apparatus for producing the same. The method will now be described. The term "roll," as used herein, is intended also to cover ring dies, roll dies, half dies and the like.

In FIGURES 9–15, the step-by-step method of manufacturing the roll 10 is shown in detail. The reference numeral 11 indicates a conventionally machined cylindrical blank and dash-dot lines 12 and 13 illustrate the manner in which outer cylindrical roll surface 11a and opposite ends or end faces 13 are machined to shape (FIGURES 9 and 10).

The blank 11 is then centrally bored to provide it with an axial central roll passageway or roll bore 11c, as illustrated in FIGURES 11 and 12. Any suitable apparatus may be used for machining the surfaces 11a and 11b and for boring the blank 11 to provide the passageway 11c.

Before the roll blank 11 is subjected to a hardening process, an annular or circular groove 11d is turned in the outer circumference or outer annular surface 11a of the roll blank 11. A sufficient amount of material is left on the grooved roll surface area so that it may subsequently be machined to final shape after the roll blank 11 has been quenched.

A keyway 11e is then machined longitudinally of the roll blank 11 along the annular bore surface 11c which defines the internal bore (FIGURE 15). Relief grooves or grooved areas 11f are then formed in any suitable way in the outer cylindrical roll surface 11a. It will be noted the relief grooved areas 11f are disposed 180° apart and divide the annular groove 11d into a pair of arcuate grooved areas 11d.

The roll blanks formed in accordance with the aforesaid steps are then heated to a suitable temperature and quench hardened or hardened in any suitable way. After the hardened roll blanks 11 have cooled, the external roll surface areas may be further machined to remove any scale. A grinding process may be very effectively used to remove the scale.

According to the present invention, the arcuate grooves 11d are then burned with an electrical spark discharge to form arcuate tapered grooves or arcuate tapered grooved surface areas 11d". By this technique, conventional hand methods of forming tapered grooves on a forming roll are no longer necessary and the expense of producing the roll 10 may be substantially reduced. By varying the electrical spark discharge, the rate of burning may be controlled to obtain a rough cut or burn or a smooth burn or cut. By the use of this technique it is also possible to burn the tapered groove 11d" in such a way that it does not need polishing. The finish obtained may be varied by altering the rate of electrical spark discharge and/or the gap size between the rolls as will hereafter be discussed in further detail.

As shown in FIGURE 2, it is now possible to simultaneously form the tapered grooves in a pair of forming rolls according to the present method. The tapered surface areas 11d" may be fine finished if desired by rubbing orange wood thereagainst. As illustrated, the tapered grooves 11d" are adapted to reduce different sized tubes with one of the grooves 11d" adapted to reduce 1¼ inch tube stock to one-inch and with the other groove 11d" adapted to reduce the one-inch stock to ¾ inch.

According to the features of the present invention, an apparatus 100 is provided for machining metal articles such as rolls which apparatus includes a base or frame 101. A journal block 102 is mounted on the frame 101 and a fluid bath 103 is disposed adjacent the block 102 on the frame. In this regard it will be noted the bath 103 includes a U-shaped plate 103a which is secured by fasteners 103b to the block, the block forming a side wall of the bath 103.

The bath 103 has a lower end or sump 104 disposed below the part of the frame 101 on which the block 102 is supported, as shown in FIGURE 3. Mounted within the bath including the sump 104 is a vertically movable carriage 105. The carriage 105 includes upper and lower carriage plates 106 and 107 which are joined together by means of a splined shaft 108. The plates 106 and 107 have split plate portions 106a and 107a where opposite ends of the splined shaft 108 are disposed and secured in locked assembly with the plates by means of fasteners or screws 106b and 107b.

It will be noted from a consideration of FIGURE 7 that the splined shaft 108 extends through a vertically extending shaft block bore 108a and more particularly through a bushing 109. The bushing 109 has a collar 109a at one end and is secured to the block by means of fasteners 109b. It will further be noted from FIGURE 7 that the bushing 109 is splined at 109c for proper fitting with the splined shaft 108. The bushing splines 109c extend only to the point 109b as indicated in FIGURE 7 with a lower end 109e of the bushing 109 having a smooth bore. The lower end 109e of the bushing 109 is provided with a series of circumferentially spaced recesses 109f and pieces or strips of felt packing 110 are disposed in each of the recesses 109f and engaged in the splined grooves on the splined shaft 108 for the purpose of wiping the grooves free of metal particles before the splined shaft 108 is engaged with the splined port end 109c of the bushing 109. A bushing ring or collar 111 is secured to the block 102 by means of collar fasteners 111a for the purpose of clamping the felt ring 110' against the sleeve 108a. When the felt needs to be replaced, the collar 111 can be readily removed from the block to enable the old felt pieces 110 and the ring 110' to be removed so that new ones can be substituted. In summary, as the carriage 105 is moved vertically in the bath 103, the splined shaft 108 moves vertically of the block 102 and the felt fingers or extensions or pieces 110 engage within the grooves of the splined shaft 108 to wipe them clean so that the shaft will not be damaged during its vertical movement with the splined end 109c of the bushing 109. The bath 103 including the sump is filled with a suitable dielectric or oil and particles cut from the articles or rolls being machined fall to the bottom of the sump 104. Some of these particles are in suspension in the oil and unless the block 102 is provided with means for cleaning out the grooves in the splined shaft 108, the life of the splined shaft 108 will be reduced.

Mounted on the carriage 105 is an electrode 112 which preferably has a conical or tapered configuration and may be made of any suitable material suitable for use in an electrical discharge machining operation. The peripheral surface 112a of the electrode must be very carefully shaped since its configuration is to be imparted to the articles or rolls 11 to be manufactured. In this instance, since it is desired to machine tapered grooves in the rolls 11, the electrode 112 is constructed so as to have a tapered or conical shape. It is in this way that tapered semi-circular shaped grooves can be simultaneously machined in the periphery of a pair of rolls 11 disposed in side-by-side spaced relation, as shown in FIGURE 4.

Needle holders 115 and 116 are provided for securing the needles 113 and 114 to the plates 106 and 107. The needle holder 115 includes an outer needle holder bushing 117 which extends through a plate hole 118 in the plate 106. The bushing 117 has a collar 117a that is secured to a bushing electrical insulator collar 119a of an electrical insulator or bushing 119 by means of bolts 120. The electrical insulator collar 119a is in turn secured to the plate 106 by means of bolts 120′ (FIGURE 6). Disposed interiorly of the bushing 117 is a needle holder rod 121 which is threaded at one end at 122 and is recessed at an opposite end at 123. The needle 113 is disposed in the recessed end 123 of the needle holder rod 121.

In order to secure the needle 113 with the needle holder rod 121, the rod 121 has a pin 124 secured in threaded assembly within its recessed end 123. The pin 113 is provided with a slot 113a and the pin 124 is secured within the slot to permit the needle 113 to move vertically to a limited extent with respect to the rod 121. The needle 113 is recessed at its upper end at 113b and a spring 125 is disposed therein. The spring 125 acts between the needle 113 and the rod 121 to urge the needle 113 vertically downwardly out of the recessed end 123 of the rod 121 so that the needle 113 may be secured in tensioned assembly with the electrode 112. Secured with the threaded end 122 of the rod 121 is a hand wheel 126. A ring-shaped collar 127 is engaged on top of a flanged end 126a of the hand wheel 126 and the fastener 120 serves to clamp the collar 127 against the flanged end 126a of the hand wheel to secure the hand wheel in assembly with the plate 106. In operation, as the hand wheel is turned, the rod 121 as well as the needle 113 are caused to move vertically of the plate into and out of engagement with respect to the electrode 112.

By permitting the needle 113 to move vertically with respect to the electrode 112 by virtue of the pin and slot connection 124 and 113a, the electrode 112 can expand when heated without damaging the electrode or the needles 113 or 114 or the needle holders 115 and 116.

The lower needle holder 116 includes a tubular sleeve 128 which has a bore 128a in which the needle 114 is disposed. An O-ring seal 129 is provided at an upper end of the lower needle holder sleeve 128 for the purpose of preventing oil from the bath from entering the bore 128a.

The needle 114 has a threaded end 114a which is secured in threaded assembly with a threaded section 128a′ of the bore 128a. The vertical position of the needle 114 may be adjusted by rotating the needle 114 so that it may be moved either upwardly or downwardly with respect to the lower needle holder sleeve 128. The sleeve 128 is secured to an electrical insulator or bushing 129′ by means of fasteners 130 and the bushing 129′ is secured to the lower plate 107 by means of fasteners, as indicated at 130′. It will further be noted that lower ends of the needle 114 and of the lower needle holder sleeve 128 extend vertically through plate hole 131 and a screwdriver may be applied against the lower end 114b for the purpose of moving the needle vertically with respect to the sleeve 128. A removable cap 132 is secured over the lower end 114b of the needle 114 by means of suitable fasteners such as indicated at 133.

Roll supporting shafts 140 and 141 are journalled on the block 102 by means of bearings 143, 143 (FIGURE 3) which may be of any suitable type. In order to secure the bearings with the block 102, each of the shafts 141 and 142 are provided with a pair of rings 144, 144 which are suitably secured to the block 102 by fasteners 145.

The shafts 140 and 141 are provided with front and rear ends 140a, 140b, 141a and 141b. The outer shaft ends 140a and 141a are each provided with keys 140c and 141c which are secured in the keyways 11e on the rolls 11 so that when the rolls 11 are mounted on the outer ends of the shafts they will not rotate relative to the shafts. Means is provided on each of the shafts for fixedly clamping the roll to the associated end of the shaft. This means includes roll support plates and fasteners 146 and 147, the fasteners 147 being in threaded assembly with the front end of one of the shafts to secure the plate 146 in clamped assembly therewith whereby the roll is held in clamped assembly with the associated roll support shaft.

*Carriage and Roll Actuating Mechanism*

The reference numeral 150 indicates generally a carriage and roll actuating mechanism. This mechanism includes a prime mover which may be of any suitable type such as a fluid motor as indicated at 151 in FIGURE 1. The fluid motor has fluid lines 151a′ and 151b′ for controlling the operation of the fluid motor.

A motor support plate 151a is secured to the block 102 by suitable fasteners. A motor pivot plate 151b is secured to the motor support plate 151a by means of a pivot pin 151c (FIGURE 5). Mounted on a motor drive shaft 151′ is a pinion gear 152. The pinion gear 152 is in meshed engagement with rack drive gear 153 and the rack drive gear 153 is in mesh with the driven gear 154.

The gears 153 and 154 are mounted on the rear ends 140b and 141b of the spindles 140 and 141 as shown in FIGURE 2. Gear fastener plates 155 and 156 and gear plate fasteners 157 and 158 are provided for attaching the gears 153 and 154 on the spindles 141 and 140. It will therefore be seen that the spindle bearings provide bearings not only for the rolls but also for the gears for driving the rolls, the rolls and gears being disposed at opposite ends of the spindles 140 and 141.

Mounted on the upper plate 106 of the carriage 105 is a rack holder 160. The rack holder 160 has a threaded end 160a and a rack turn wheel 161 is secured to it for the purpose of moving the holder 160 vertically up and down. The holder 160 has a yoke 160b at its opposite end and a rack 162 is secured to the yoke 160b by means of yoke pin 160c. It will be further noted that the rack 162 is in mesh with the rack drive gear 153 so that the carriage 105 can move up and down by the operator through manipulation of the controls of the reversible fluid motor 151. The lower end of the rack 162 extends into a rack guide housing 163 which is disposed below the base 101 (FIGURE 5).

A rack guide block 164 is secured to the main block 102 by fasteners 165 (FIGURE 5). The block is recessed at 164a and a brass bearing rack guide 166 is mounted therein. The guide 166 bears against the rack 162 during its vertical movement to maintain the rack in contact with the gear 153.

In view of the foregoing description, it will be appreciated that a single reversible fluid motor 151 may be employed to operate the carriage as well as to rotate the rolls toward the electrode as the electrode is moved vertically upwardly in the space between the rolls, in accordance with important features of the present invention.

In order to circulate oil through the oil bath 103 and the sump 104, a motor and pump are provided (not shown) as well as a fluid line one of which is joined with the lower end of the sump at 104c to permit the oil in the sump and the bath to be circulated and cleansed of metal particles. Also, the sump 104 has a ring 104a (FIGURE 4) in welded assembly therewith. The ring 104a suspends the sump on frame or base shoulder 101a, the ring 104a being secured by fasteners such as bolts 104b to the base 101.

In the event that the oil in the bath 103 overflows, the base 101 has a dished area 101′ which functions to collect any oil spillage whereupon the oil is returned to the oil circulating system by means of suitable fluid line (not shown).

The technique of electrically discharging an electrode for the electrical discharge machining of an article, broadly speaking, is well known as set forth in the U.S. Patent 2,526,423. With respect to the present apparatus, the negative pole of a supply circuit is connected with the electrode 112 to effect electrical discharge from the electrode, and the positive pole of the circuit is connected to the workpiece or to the rolls 11. As shown in FIGURE 3, a power line 170 is secured by nuts 171 to the threaded end 122 of the needle holder rod. The frame 101 is grounded at 172. The electrical principles for effecting electric spark machining or cutting of metal are well known in the art, such as is set forth in the U.S. Patent 2,526,423.

If desired, the frame 101 and all of the structures mounted thereon can be rotated 90° to permit the electrode to be fed horizontally into the rolls to machine them.

*Operation*

After the rolls 11 have been formed to shape, as shown in FIGURE 15, they are then mounted on the apparatus 10 for the purpose of tapering the grooves 11d' so as to provide tapered semi-circular grooves 11d", as shown in FIGURE 3. The electrode 112 is moved vertically in the gap between the rolls to effect electrical discharge of the grooves 11d' for tapering them. During the machining operation the surface of the electrode 112 is at all times maintained in spaced relation with respect to the surface of the rolls being machined to prevent a short circuit. The spacing between the electrode and the surface being machined may be varied to vary the finish being machined on the rolls. During the machining operation, the oil is continuously circulated about the electrode so that the cut metal particles are conveyed away from the cutting area. While a bath has here been employed, it will also be appreciated that with respect to the broad principles of the present invention, an oil stream could be directed against the rolls and the electrode in the cutting zone so as to immerse the cutting zone with oil as shown in U.S. Patent No. 2,526,423. In order to insure that the cutting zone is properly immersed in oil, it is preferable that a cutting zone be immersed in an oil bath as shown in the drawings. The keys on the spindles serve to properly align the rolls with respect to one another so that the rolls may be uniformly machined and used as a pair in a roll forming machine. First one groove on each of the rolls is machined and then the rolls 11 are removed from the machine and turned back side front and remounted on the spindles so that the keys are engaged in the keyways. Then the electrode is again caused to move vertically upwardly through the space between the rotating rolls to provide a second tapered groove 11d" in each of the rolls. These rolls which are comprised of a heat treated hardened metal after being provided with tapered arcuate tube forming grooves are then polished by rubbing the grooves with an orange wood until provided with a 15–20 microfinish thereon.

It will be understood that modifications and variations may be effected without departing from the scope of the novel concepts of the present invention.

I claim as my invention:

1. An apparatus for machining a groove in a metal article while in a heat treated hardened state which includes
    a fluid bath,
    means for supporting the article in said bath,
    a tapered electrical discharge electrode having a configuration corresponding to the groove shape to be machined in the metal article mounted to one side of the electrode,
    means for energizing the electrode and for causing the tapered electrode to emit an electrical spark discharge for effecting cutting of the groove in a surface of the article while the electrode is moving upwardly in the bath, and
    means for moving the energized electrode vertically upwardly in the bath from beneath the article and tangentially of the article while contemporaneously moving the article in an arcuate path on a side of the electrode to establish a cutting zone along the article surface opposite the electrode during the upward vertical movement whereby metal particles will fall away from the cutting zone to minimize short circuits.

2. An apparatus for machining grooves in metal rolls while in a heat treated hardened state which includes
    a fluid bath,
    means for supporting the rolls in spaced side-by-side relation in said bath,
    a conical electrical discharge electrode having a configuration corresponding to the shape of the grooves to be machined in the metal rolls,
    means for energizing the electrode and for causing the conical electrode to emit an electrical spark discharge for effecting cutting of the grooves in peripheral surfaces of the rolls while the electrode is moving upwardly in the bath, and
    means for moving the energized electrode vertically upwardly in the bath in a gap between the rolls tangentially of the rolls while contemporaneously rotating the rolls in arcuate paths on opposite sides of the electrode to establish a cutting zone along the surfaces of the rolls opposite the electrode during the upward vertical movement whereby metal particles will fall away from the cutting zone to minimize short circuits.

3. An apparatus for machining grooves in metal articles disposed in side-by-side relation which includes
    a fluid bath,
    means for supporting the articles in said bath,
    a tapered electrical discharge electrode having a configuration corresponding to the shape of the grooves to be machined in the metal articles,
    means for energizing the electrode and for causing the tapered electrode to emit an electrical spark discharge for effecting cutting of the grooves in surfaces of the articles, and
    means for moving the energized electrode vertically upwardly in the bath and tangentially of the articles while contemporaneously moving the articles in arcuate paths on opposite sides of the electrode to establish a cutting zone along the article surfaces opposite the electrode during the upward vertical movement whereby metal particles will fall away from the cutting zone to minimize short circuits.

4. An apparatus for machining grooves in metal rolls while in a heat treated hardened state which includes
    a frame,
    a fluid bath on the frame,
    a carriage movably supported on said frame,
    arbors on said carriage for supporting the rolls in said bath,
    an electrode holder mounted on said carriage,
    a tapered electrical discharge electrode carried by said carriage and having a configuration corresponding to the shape of the grooves to be machined in the metal rolls,
    means for energizing the electrode and for causing the tapered electrode to emit an electrical spark discharge for effecting cutting of the grooves in the rolls, and
    means for moving the carriage to carry the energized electrode vertically upwardly in the bath and tangentially of the rolls while contemporaneously moving the rolls in arcuate paths toward the electrode to establish a cutting zone along the roll surfaces opposite the electrode during the upward vertical movement whereby metal particles will fall away from the cutting zone to minimize short circuits.

5. An apparatus for machining grooves in metal rolls while in a heat treated hardened state which includes
    a frame,
    a fluid bath on the frame,
    a carriage movably supported on said frame,
    arbors on said carriage for supporting the rolls in said bath,
    an electrode holder mounted on said carriage,
    a tapered electrical discharge electrode carried by said carriage and having a configuration corresponding to the shape of the grooves to be machined in the metal rolls, means for energizing the electrode and for causing the tapered electrode to emit an electrical spark discharge for effecting cutting of the grooves in the rolls, and means for moving the carriage to carry the energized electrode vertically upwardly in the bath and tangentially of the rolls while contemporaneously moving the rolls in arcuate paths toward the electrode to establish a cutting zone along the roll surfaces opposite the electrode during the upward vertical movement whereby metal particles will fall away from the cutting zone to minimize short circuits, said means for moving the carriage comprising gearage connected to said carriage and a fluid motor drivingly connected to said gearage.

6. An apparatus for machining grooves in metal rolls which includes a frame having a fluid bath, a carriage movably supported on said frame and extending into the fluid bath, spaced arbors on each carriage for supporting the rolls in side-by-side relation in said bath, an electrode holder mounted on said carriage, an electrical discharge electrode carried by said holder on said carriage and with the electrode being movable upwardly from beneath the arbors for machining the grooves in the metal rolls, means for energizing the electrode and for causing the electrode to emit an electrical spark discharge for effecting cutting of the grooves in the rolls, and means for moving the carriage to carry the energized electrode in the bath in a space between the arbors and tangentially of the rolls while contemporaneously moving the arbors in arcuate paths toward the electrode to establish a cutting zone along the roll surfaces opposite the electrode whereby cut metal particles will fall beneath the arbors and rolls and away from the cutting zone.

7. An apparatus for machining a groove in a metal article while in a heat treated hardened state which includes a frame, means for supporting the article on said frame, a tapered electrical discharge electrode having a configuration corresponding to the groove shape to be machined in the metal article being mounted adjacent the article and having its most reduced tapered end overlying a remaining portion of the electrode but positioned beneath said means for supporting the article on the frame for cutting of the article from an underlying position, means for energizing the electrode and for causing the tapered electrode to emit an electrical spark discharge for effecting cutting of the groove in a surface of the article, means for causing relative movement between the energized electrode and the article as the article is rotated in an arcuate path of rotation on a side of the electrode to establish a cutting zone along the article surface opposite the electrode, and means for directing a stream of oil across the cutting zone.

8. An apparatus for machining metal rolls while in a heat treated hardened state which includes a frame, a block on said frame, a fluid bath on the frame adjacent the block, a carriage movably supported on said frame, shafts journalled on said block each for supporting a roll at one end in said bath, meshed roll gears mounted on opposite ends of said shafts, an electrode holder mounted on said carriage, an electrical discharge electrode carried by said carriage for machining the rolls and mounted beneath said shafts, means for energizing the electrode and for causing the electrode to emit an electrical spark discharge for effecting machining of the rolls, a rack secured to said carriage in mesh with one of said roll gears, and a power driven gear in mesh with one of said roll gears for rotating said roll gears in arcuate paths toward one another and for causing upward vertical movement of the rack, carriage and electrode in unison together for machining rolls while permitting machined particles to fall away from the rolls to minimize short circuits, whereby the energized electrode is caused to move tangentially of the rolls to establish a cutting zone along the roll surfaces opposite the electrode.

9. An apparatus for machining metal rolls while in a heat treated hardened state which includes a frame, a block on said frame, a fluid bath on the frame adjacent the block, a carriage movably supported on said frame, shafts journalled on said block each for supporting a roll at one end in said bath, meshed roll gears mounted on opposite ends of said shafts, an electrode holder mounted on said carriage, an electrical discharge electrode carried by said holder on said carriage beneath said shafts for machining the rolls, means for energizing the electrode and for causing the electrode to emit an electrical spark discharge for effecting machining of the rolls, a rack secured to said carriage in mesh with one of said roll gears, a power driven gear in mesh with one of said roll gears for rotating said roll gears in arcuate paths toward one another and for causing vertical movement of the rack, carriage and electrode in unison together, whereby the energized electrode is caused to move tangentially of the rolls to establish a cutting zone along the roll surfaces opposite the electrode, and a motor joined with said power driven gear and swingably mounted on said frame with said power driven gear engaging and disengaging the power driven gear with one of said roll gears.

10. An apparatus for machining metal rolls which includes a frame, a block on said frame, a fluid bath on the frame adjacent the block, a carriage including upper and lower carriage plates movably supported on said frame in said bath, a splined shaft extended through said block and secured at opposite ends with said upper and lower carriage plates joining them in unitary assembly, shafts journalled on said block each having means for fixedly clamping a roll to one end of said shaft, meshed roll gears mounted on opposite ends of said shafts, an electrode holder having upper and lower holder needles mounted on said upper and lower carriage plates of said carriage, an electrical discharge electrode carried between said holder needles for machining the rolls, means for causing the electrode to emit an electrical spark discharge for machining of the rolls, a rack secured to said upper carriage plate in mesh with one of said roll gears, a power driven gear in mesh with one of said roll gears for rotating said roll gears in arcuate paths toward one another and for causing vertical movement of the rack, carriage and electrode in unison together, whereby the energized electrode is caused to move tangentially of the rolls to establish a cutting zone along the roll surfaces opposite the electrode.

11. The apparatus of claim 10 further characterized by said block having a series of felt-like wiping fingers for cleaning metal cuttings from the splined shaft to reduce wear.

12. The apparatus of claim 10 further chacterized by said electrode being conical in shape for cutting tapered grooves in the rolls.

13. The apparatus of claim 10 further characterized by a hand wheel disposed on top of said upper carriage plate and joined with an upper end of said upper holder needle enabling the holder and electrode to be adjusted in assembly together.

14. An apparatus for machining metal rolls which includes
 a frame,
 a block on said frame,
 a carriage including upper and lower carriage plates movably supported on said frame,
 a splined shaft extended through said block and secured at opposite ends with said upper and lower carriage plates joining them in unitary assembly,
 shafts journalled on said block each having means for fixedly clamping a roll to one end of said shaft,
 an electrode holder having upper and lower holder needles mounted on said upper and lower carriage plates of said carirage,
 an electrical discharge electrode carried between said holder needles for machining the rolls,
 means for causing the electrode to emit an electrical spark discharge for machining of the rolls,
 means for arcuately moving said shafts in opposite directions with respect to one another and for movement of the rack, carriage and electrode in unison together,
whereby the energized electrode is caused to move tangentially of the rolls to establish a cutting zone along the roll surfaces opposite the electrode, and
 means for directing a stream of oil across the cutting zone.

15. In a method for machining grooves in metal rolls while in a heat treated hardened state, the steps of
 mounting rolls is side-by-side relationship,
 disposing a tapered electrical discharge electrode having a configuration corresponding to the groove shape to be machined in the metal article below the rolls in alignment with the space between the rolls,
 moving the rolls in arcuate paths toward one another and toward the electrode,
 energizing the electrode for causing the tapered electrode to emit an electrical spark discharge for cutting grooves in the rolls, and
 causing relative movement between the moving rolls and the energized electrode while disposing the electrode in the space between the rolls establishing an electrical discharge cutting zone along the surfaces opposite the electrode cutting grooves in the rolls whereby machined particles will fall away from the cutting zone to minimize electrical shorts.

16. In a method for machining metal articles, the steps of
 mounting articles in side-by-side spaced relationship,
 disposing an electrical discharge electrode having a configuration corresponding to the shape to be imparted in the metal articles below the rolls in alignment with the space between the articles,
 moving the articles in arcuate paths toward one another and toward the electrode,
 energizing the electrode causing the electrode to emit an electrical spark discharge,
 causing relative vertical movement between the moving articles and the energized electrode,
 whereby the electrode is disposed in the space between the articles establishing a cutting zone along the rotating surfaces opposite the electrode for machining the rotating surfaces of the articles, and
 directing a stream of oil across the cutting zone during the machining operation.

17. In a method for machining metal rolls, the steps of
 mounting rolls in side-by-side spaced relationship,
 disposing a tapered electrical discharge electrode having a configuration corresponding to the shape to be machined in the surfaces of the metal rolls below the rolls in alignment with the space between the rolls,
 moving the rolls in arcuate paths toward one another and toward the electrode,
 energizing the electrode causing the tapered electrode to emit an electrical spark discharge,
 causing vertical movement of the electrode between the moving rolls,
whereby the electrode is disposed in the space between the rolls establishing a cutting zone along the surfaces opposite the electrode for machining the rolls, and
 directing a stream of oil across the cutting zone during the machining operation.

18. An apparatus for machining grooves in metal rolls while in a heat treated hardened state which includes
 means for supporting the rolls in side-by-side spaced relation,
 a tapered electrical discharge electrode having a configuration corresponding to the shape of the grooves to be machined in the metal rolls mounted below the rolls,
 means for causing the electrode to emit an electrical spark discharge and for moving the energized electrode vertically and tangentially of the spaced rolls while moving the rolls in arcuate paths in opposite directions with respect to one another but toward the electrode to establish a cutting zone along the moving roll surfaces opposite the discharging electrode, and
 means for immersing the cutting zone between the electrode and the rolls of the dieletcric material.

19. An apparatus for machining grooves in metal rolls while in a heat treated hardened state which includes
 means including roll support spindles for supporting the rolls in side-by-side spaced relation,
 the spindles having keys for aligning the grooves on the rolls with respect to one another so that the grooves may be tapered in any identical manner,
 a tapered electrical discharge electrode having a configuration corresponding to the shape of the grooves to be machined in the metal rolls mounted below the rolls,
 means for causing the electrode to emit an electrical spark discharge and for moving the energized electrode between the spindles and tangentially of the spaced rolls while rotating the spindles and the rolls in opposite directions with respect to one another but toward the electrode to establish a cutting zone along the rotating roll surfaces opposite the discharging electrode, and
 means for immersing the cutting zone between the electrode and the rolls of the dielectric material.

20. An apparatus for machining metal rolls which includes
 a frame,
 a block on said frame,
 a carriage movably supported on said frame,
 shafts journalled on said block each having means for fixedly clamping a roll to one end of said shaft,
 an electrode holder having spaced needles mounted on said carriage,
 an electrical discharge electrode carried between said holder needles for machining the rolls, means for causing the electrode to emit an electrical spark discharge for machining of the rolls, means for rotating said shafts in opposite directions with respect to one another and for movement of carriage and electrode in unison together enabling the energized electrode to be moved tangentially of the rolls to establish a cutting zone along the roll surfaces opposite the electrode, and means for directing a stream of oil across the cutting zone.

21. The apparatus of claim 8 further characterized by said rack being backed up by a guide bearing holding it in mesh with one of said roll gears.

22. A method of forming a metal forming roll which comprises forming a cylindrical roll blank,
machining an outside surface of the rolls and facing the ends of the roll providing end faces,
boring a bore through the roll,
milling a keyway in the bore,
heat treating the roll,
grinding the inside and outside surfaces and the end faces of the roll, and
turning the roll while upwardly moving a tapered electrode tangentially of the roll and electric spark burning a tapered groove in the roll while the cutting zone is immersed in oil to permit thus machined particles to fall away from the cutting zone to minimize short circuits.

23. A method of forming a metal forming roll which comprises forming a cylindrical roll blank,
machining an outside surface of the rolls and facing the ends of the roll providing end faces,
boring a bore through the roll,
milling a keyway in the bore,
heat treating the roll,
grinding the inside and outside surfaces and the end faces of the roll,
turning the roll while upwardly moving a tapered electrode tangentially of the roll and electric spark burning a tapered groove in the roll while the cutting zone is immersed in oil to permit thus machined particles to fall away from the cutting zone to minimize short circuits, and
hand polishing the tapered groove to approximately a 15–20 micro finish.

24. An apparatus for machining a tapered groove in a metal article while in a heat treated hardened state which includes a frame,
means for supporting the article on said frame,
an electrical discharge electrode having an essentially smooth longitudinally tapered curved outer surface with a configuration corresponding to the groove shape to be machined in the metal article being mounted adjacent the article and having its most reduced tapered end overlying a remaining portion of the electrode but positioned beneath said means for supporting the article on the frame for cutting of the article from an underlying position,
means supporting the electrode against rotation,
means for energizing the electrode and for causing the tapered electrode to emit an electrical spark discharge for effecting cutting of the groove in a surface of the article,
means for causing relative movement between the energized electrode and the article as the article is rotated in an arcuate path of rotation on a side of the electrode to establish a cutting zone along the article surface opposite the electrode, and
means for directing a stream of oil across the cutting zone.

References Cited in the file of this patent
UNITED STATES PATENTS

| | | |
|---|---|---|
| 832,304 | Farrington | Oct. 3, 1906 |
| 1,395,607 | Sorensen | Nov. 1, 1921 |
| 1,555,771 | Stenz | Sept. 29, 1925 |
| 1,947,462 | Doorbar | Feb. 20, 1934 |
| 2,739,935 | Kehl et al. | Mar. 27, 1956 |
| 2,773,968 | Martellotti et al. | Dec. 11, 1956 |
| 2,813,966 | Matulaitis | Nov. 19, 1957 |
| 3,042,789 | Niederhoff | July 3, 1962 |

OTHER REFERENCES

"Aircraft Production," "Electric-Spark Erosion," August 1952 (pp. 271–274).